June 10, 1924.

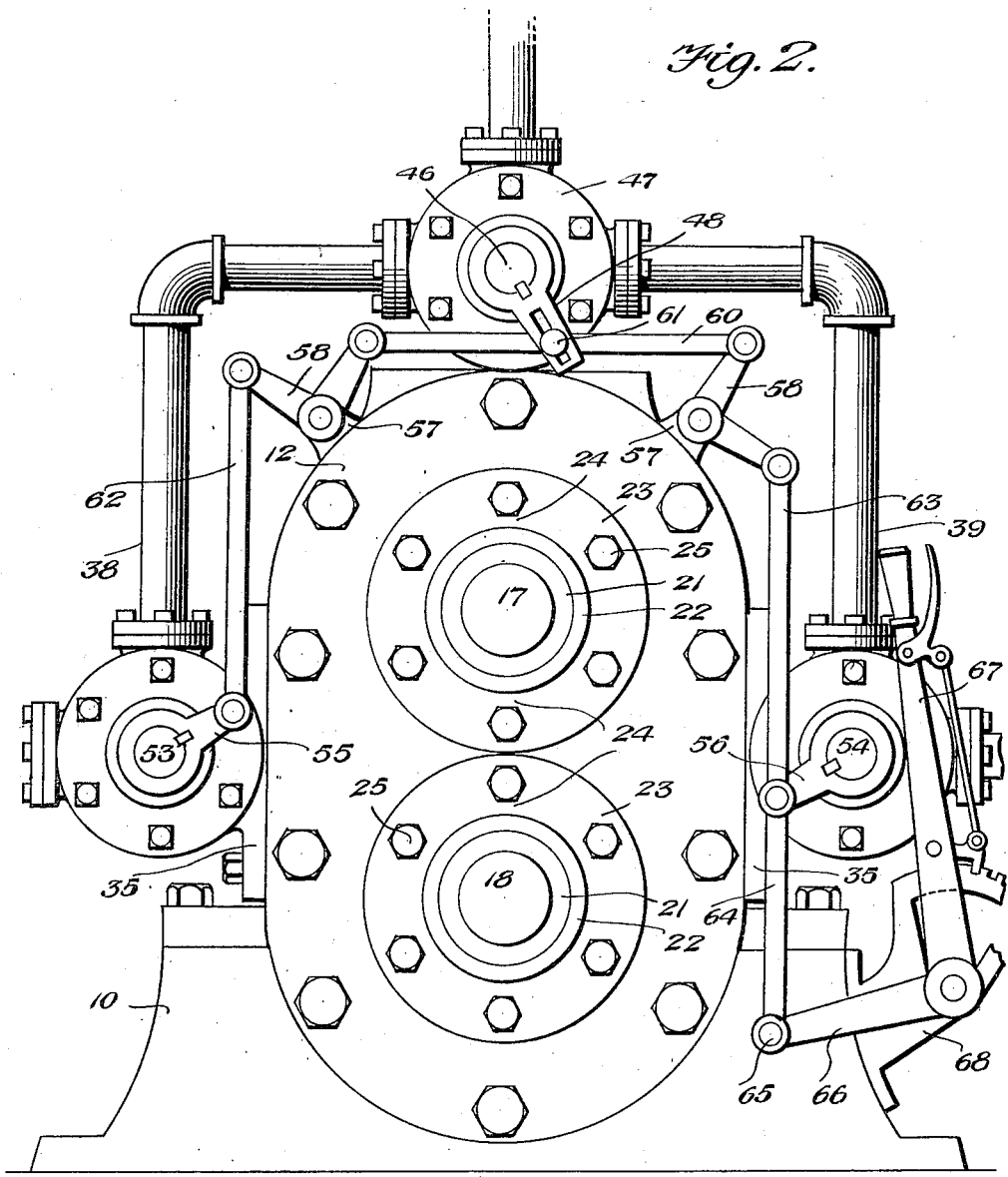

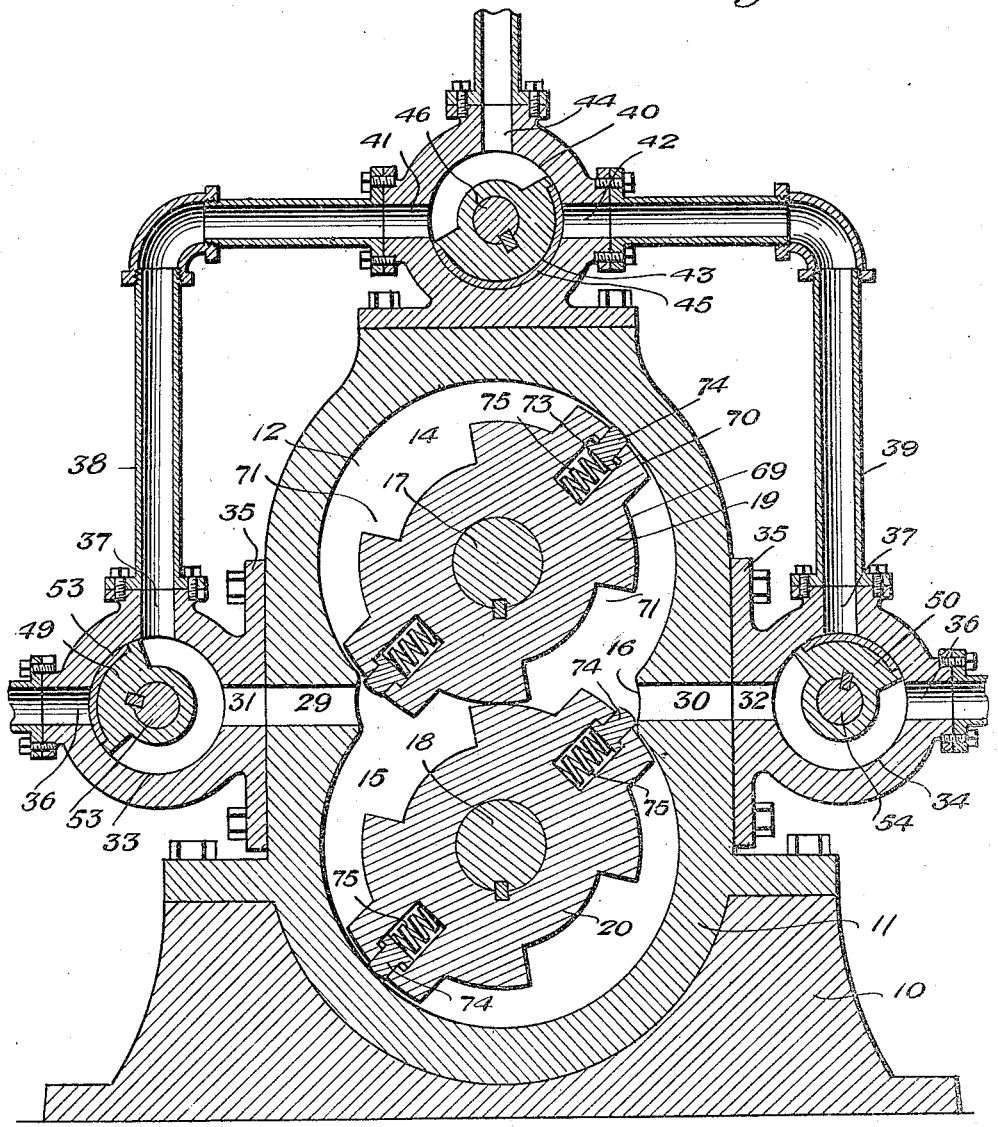

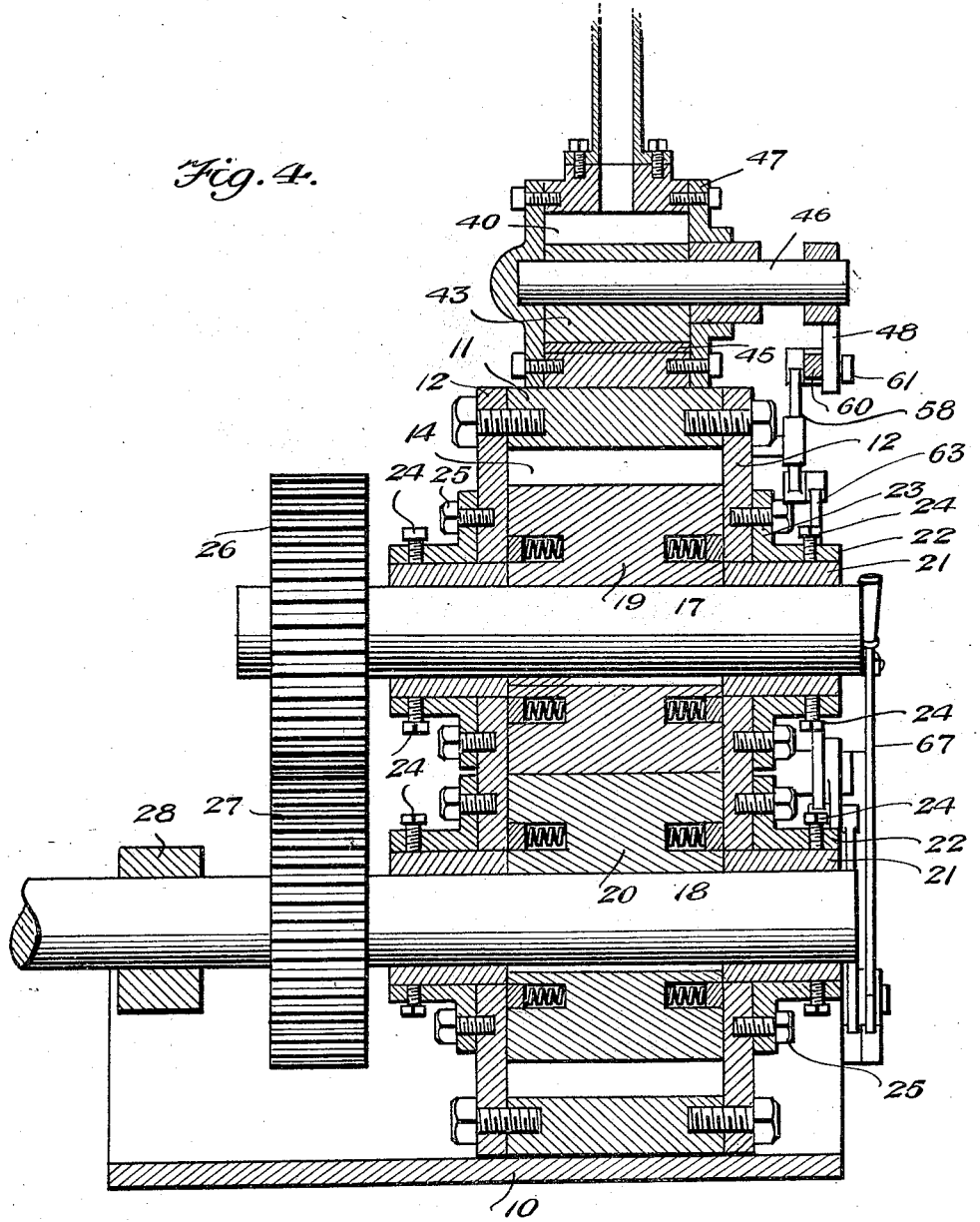

J. P. JOHNSON

ENGINE

Filed May 25, 1920   5 Sheets-Sheet 5

1,497,239

John P. Johnson
INVENTOR

BY Victor J. Evans
ATTORNEY

WITNESS:

Patented June 10, 1924.

1,497,239

UNITED STATES PATENT OFFICE.

JOHN P. JOHNSON, OF KALISPELL, MONTANA.

ENGINE.

Application filed May 25, 1920. Serial No. 384,072.

*To all whom it may concern:*

Be it known that I, JOHN P. JOHNSON, a citizen of the United States, residing at Kalispell, in the county of Flathead and State of Montana, have invented new and useful Improvements in Engines, of which the following is a specification.

The present invention has reference to a rotary engine.

An object is to produce a rotary engine in which the fluid is delivered to a chest having by-passes connecting the same to other chests, the latter having inlet and outlet ports, the ports of all of the chests being controlled by valves which are operated by a single lever, so that the flow of fluid may be controlled, and properly directed to either side of the pistons.

A further object is to produce a rotary engine in which the pistons are of such construction that no dead center thereof can occur, and in which the operating fluid is controlled by a single lever, so that the pistons may be caused to turn in either direction and at predetermined rates of speed without changing inlet or outlet ports.

A further object is to produce a rotary engine in which two co-operating pistons are arranged in communicating chambers of a casing, and in which the pistons have timed engagement with each other and have expansible packings to properly contact with the walls of the chambers and with each other so that the motive fluid will positively operate against the pistons.

It is a further object of the invention to produce a rotary engine in which the valves, bearings and pistons are removable and interchangeable, and in which the construction is such as to render the same fluid tight throughout.

Many other objects and advantages will present themselves as the nature of the invention is better understood, reference being had to the accompanying drawings, in which there is illustrated a satisfactory embodiment of the improvement reduced to practice, and in which:—

Figure 2 is a side elevation thereof.

Figure 3 is a similar view but showing the end plates of the casing and the steam chests removed.

Figure 4 is a sectional view approximately on the line 4—4 of Figure 1.

Figure 1:
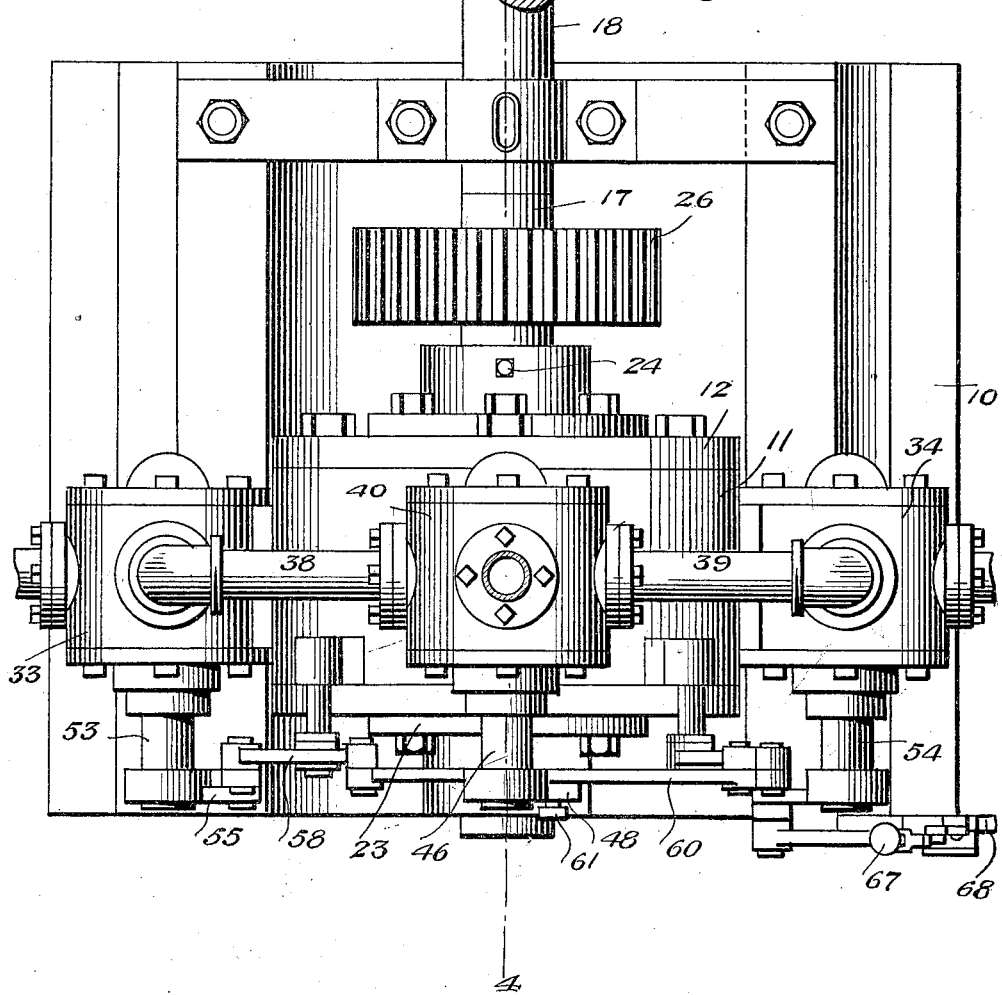
Figure 1 is a top plan view of a rotary engine, constructed in accordance with this invention.
Figure 6:
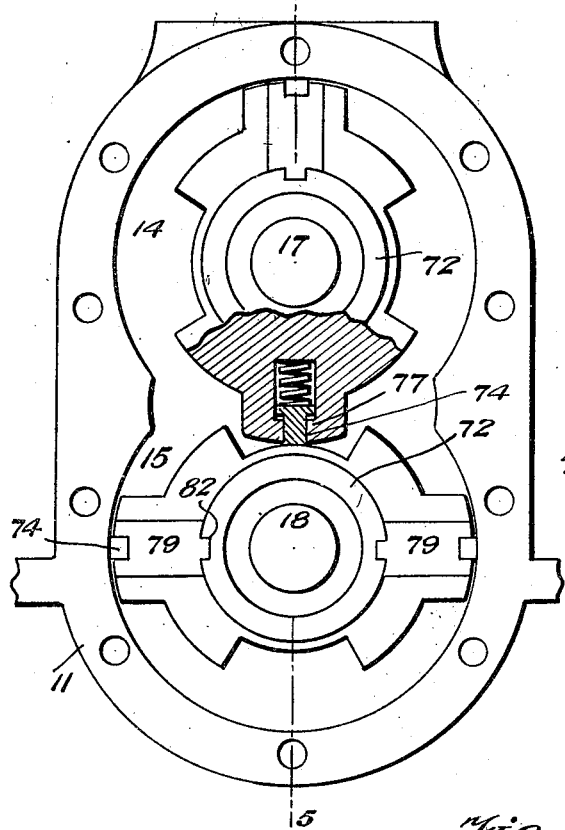
Figure 6 is a view, partly in section, and partly in elevation illustrating more clearly the manner in which the pistons are associated with the piston heads, and also showing the manner in which fluid is prevented from passing between the pistons, when the latter are in certain positions.
Figure 5:
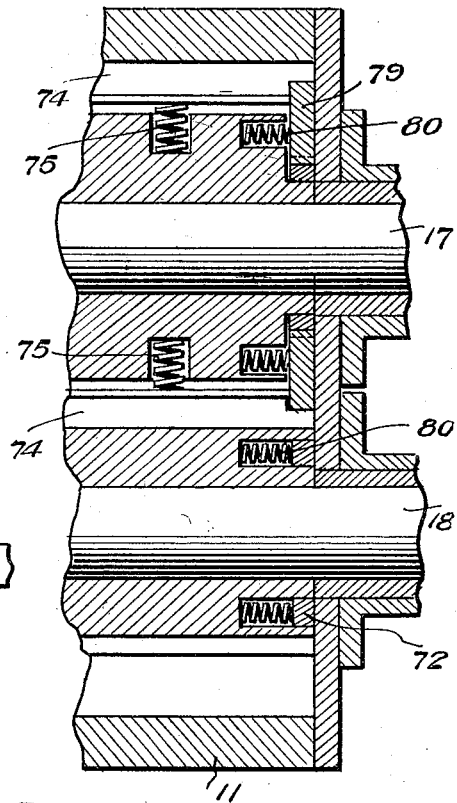
Figure 5 is a sectional view approximately on the line 5—5 of Figure 6.
Figure 7:
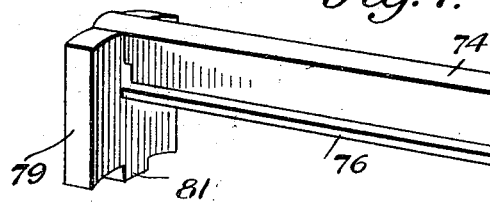
Figure 7 is a perspective view of one of the piston blades, showing the elements constituting the same assembled.
Figure 9:
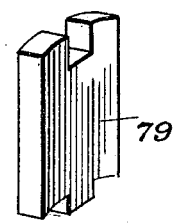
Figure 9 is a similar view showing the element constituting one of the end members of the piston.
Figure 8:
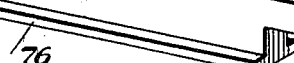
Figure 8 is a similar view of one of the elements constituting the outer blade member of a piston.

On a suitable base 10 having a central concavity, I mount the casing 11 of my improved rotary engine. The casing has its sides provided with lugs that rest on the upper edges of the base and which are bolted to the base. The casing 10 has open ends which are closed by plates 12 that are bolted thereto.

The casing includes two communicating piston chambers, the upper chamber being indicated by the numeral 14, and the lower by the numeral 15. Both of the chambers have their walls rounded and each presents more than a semi-circle, and the rounded walls of the respective casings are connected by concaved walls 16. The casing plates 12 are provided with round openings arranged centrally in the respective chambers 13 and 14, and through these openings pass shafts 17 and 18 respectively. Keyed to the respective shafts, and located in the respective chambers 13 and 14 are piston heads 19 and 20. The piston heads are of a width approximately equalling or slightly less than the width of the chambers 13 and 14.

Surrounding the shafts 17 and 18, at the portions thereof which pass through the openings in the casing plates 12 are bushings 21. These bushings are received in the rounded hub portions 22 of cap plates 23, and are locked in the hubs by bolt members 24. The cap plates 23 are bolted, as at 25 to the casing plates 12.

The shaft 17, which is connected to the upper piston head 19 is comparatively short and has keyed on one of its ends a cog wheel 26. This cog wheel meshes with a similar cog wheel 27 that is keyed on the shaft 18 that carries the lower piston head 20. The shaft 18 has its portion outward of the cog wheel 27 received through a bearing 28 that is secured on the elevated portion of the base 10, and to the shaft 18 the mechanism to be driven is hitched.

The concaved walls 15 and 16, connecting the chambers 13 and 14 have ports 29 and 30 therefor, and these ports communicate with ports 31 and 32 in steam chests 33 and 34 that have flanged base or head portions 35 which are bolted to the sides of the casing 10. The interior or bores of the chests 33 and 34 are round, and each of the chests, opposite its port 31 or 32 is provided with an outlet port 36, and with a live fluid inlet port 37. These last mentioned ports are surrounded by heads or bosses, so that suitable pipes may be connected thereto, and the ports 37 are connected by by-passes 38 and 39 to the main steam or fluid inlet chest 40. The ports 41 and 42 in the chest 40 that communicate with the pipes or by-passes 38 and 39 are controlled by a rotary valve 43 in the cylindrical bore of the chest 40. This valve also controls the fluid inlet port 44 for the chest 40. The valve is of a segmental formation, being, however, greater than one-half of a circle and preferably has its curved periphery provided with an expansible packing gland 45 that contacts with the rounded wall of the chest 40. The valve is of a size to cover one of the ports 41 or 42 that communicates with the by-passes 38 or 39 and to uncover the other port when the same is brought to one position, and also may be of a size to cover both of the ports 41 and 42, and in addition thereto the valve is operable to cover the inlet port 44 of the steam chest. The valve 43 is keyed or otherwise secured to a shaft 46 that finds bearings in the plates 47 that close the opposite sides of the chest 40, and the said shaft has on one of its ends an angularly extending slotted arm 48.

In the chests 33 and 34 there are segmental valves 49 and 50 respectively. These valves preferably have their peripherally rounded faces provided with expansible packing glands 53 that contact with the inner rounded walls of the chests 33 and 34. Each of the valves 49 and 50 is keyed to a shaft 53 and 54 respectively. Each of these shafts passes through journal boxes in the removable end plates of the chests 33 and 34. In this connection it should be stated that the shaft 46 also passes through journal boxes in the plates 47 of the chest 40. The shafts 53 and 54 each has an angularly extending arm 55 and 56 respectively.

On the sides of the casing 11, adjacent to the top thereof, there are formed outwardly extending lugs 57. To each of these lugs there is pivoted a bell crank lever 58. The outer arms of the respective bell crank levers 58 are connected by a link 60. This link has an outwardly extending headed stud 61. The stud passes through the slot in the arm 58 connected to the shaft of the valve in the fluid inlet chest 40. The second arms of the bell crank levers are connected by links 62 and 63 respectively to the arm 55 on the shaft 53 for the valve 49 in the chest 63 and the link 33 is pivotally connected to the arm 56 of the shaft of the valve 50 in the chest 34. This last mentioned arm has also connected thereto an additional link 64, the latter in turn being pivotally connected, as at 65 to the angle end 66 of a lever 67. The lever is pivoted to an outstanding bracket 68 on the base 10. It will be apparent that by moving the lever to one position the valve in the chest 34 will be turned to close the port thereof communicating with the by-pass between the said chest and the fluid inlet chest 40, and such movement of the lever will cause the links and bell crank levers to move and turn the valve 43 in the inlet chest 40 to close steam of the port communicating with the by-pass connected with the chest 34. The valve 43, in such movement uncovers the port to the by-pass in the chest 33, while the valve in the last mentioned chest is moved to close the outlet port 36 thereof. Thus the steam can flow through the chest 40 through the by-pass 38, through chest 33 and the ports communicating with the casing between the chambers 14 thereof. In a like manner the lever can be turned to cause the fluid to enter the casing from an opposite side, and also in a like manner the valve in the inlet chest 40 may be moved to close both of the bypasses or to close the fluid inlet to the said chest 40. In addition thereto the lever may be operated to control the amount of steam let into the casing from either side thereof, so that the pistons may be revolved at any desired or determined speeds.

The piston heads 19 and 20 are each in the nature of a block, having a round periphery 69 and formed with oppositely extending nose portions 70. The piston heads, centrally between the nose portions 70 have periphery notches 71 which are of a size and shape to snugly receive the nose portions of the co-acting pistons. The rounded peripheral surface of the pistons are disposed in contacting engagement, and the nose portions 70 and notches 71 of the respective piston heads are disposed at right angular relation to each other so that when the piston heads are revolved the nose of one of the piston heads will be received in the notch of the second piston head at the time that the peripheral contacting surfaces of the pistons ride off each other.

The opposite sides of the piston heads 19 and 20 have circular depressions in which are seated preferably spring influenced metallic washers 72.

The nose elements 70 of the piston heads have their outer surfaces rounded to correspond with the inner walls of the chambers in which the said piston heads are arranged, and in reality the nose portions form the pistons for the heads. However I arrange in each of the nose portions of the respective pistons expansible elements in the nature of blades and which I prefer to refer to as the pistons. Each piston head is notched in a line with the center of the nose portions thereof, and these notches provide pockets 73 for the piston blades. The blades comprise each an outer longitudinal member which is influenced in a direction outward of the piston head by one or a plurality of springs 75. The outward movement of the blades 74, by the influence of the spring 75 is limited by the contact of shoulders 76 formed on inner ribs 77 on the said blades 74, with the shoulders 78 provided in slots or notches in the end blades 79 of the respective pistons. The end blades 79 have their outer portions notched to receive the longitudinal blades, and the said blades 79 are influenced outward of their pockets by springs 80. The blades 79 are guided in their lateral movement by tongues 81 provided on the inner edges thereof which are received in grooves 82 provided on the inner wall of the pockets in which the blades are received. With the construction as above described it will be noted that all of the walls of the chambers 13 and 14 are positively contacted by elements associated with the piston heads, and also that the piston heads having a contacting engagement with each other will prevent the escape of the motive fluid therebetween, while such fluid after expanding its force of energy will be directed to the outlet port by the pistons. It is further believed that the foregoing description, when taken in connection with the drawings will clearly set forth the construction and the operation of my engine, and it is to be understood that while the drawings illustrate a satisfactory embodiment of the improvement such changes may be made therefrom as fall within the scope of my claims.

Having thus described the invention, what I claim is:—

1. In a rotary engine, a casing having communicating chambers therein, a base supporting the casing, shafts extending centrally through each of the chambers, a piston head on each of the shafts, and said heads having a rolling contacting engagement with each other, expansible pistons on the heads, means on the heads for receiving the pistons of the co-acting head when said pistons are brought against said head, fluid chests having inlet and outlet ports communicating with the opposite sides of the casing between the piston heads, valves controlling the ports in said chests, a steam inlet chest, by passes between the last and first mentioned chests, a valve controlling the ports in the last mentioned chest, pivotally supported movable elements connected to all of the valves, and an operating lever for said elements whereby to simultaneously actuate all of the valves to close the fluid inlet of one of the chests and to open the outlet thereof, and to close the outlet of the opposite chest and to open the inlet of the said chest, and likewise to close the by-pass between the steam inlet chest and the chest open to the atmosphere and to open the by-pass between the said steam inlet chest and the second mentioned chest.

2. In a rotary engine, a casing having communicating chambers therein, a piston head in each of the chambers, and said heads having a rolling contacting engagement with each other, expansible pistons carried by the heads, the pistons on one of the heads being arranged at a right angle with respect to the arrangement of the pistons on the other heads, means on the heads for receiving the pistons when the same are brought into contact therewith, said casing having side ports disposed centrally between the piston heads, chests secured to the sides of the casing and having ports communicating with the first mentioned ports, said chests also having outlet ports and an inlet port, a by-pass connected with the latter ports, a steam inlet chest secured to the top of the casing and connected with the by-passes, segmental valves in all of the chests for controlling the ports thereof, angle arms on the shafts of the valves exteriorly of the chests, and the arm of the valve of the inlet chest being slotted, bell crank levers pivoted to the sides of the casing, links connecting the levers with the arms of the valves of the side chests, a rod connecting the second arms of the bell crank levers, a headed stud on said arms passing through the slotted arm of the valve of the inlet chest, a pivoted lever having an angle arm, and a link connection between said arm and the arm of the valve of one of the side chests.

In testimony whereof I affix my signature.

JOHN P. JOHNSON.